US011042629B2

United States Patent
Perlman et al.

(10) Patent No.: US 11,042,629 B2
(45) Date of Patent: Jun. 22, 2021

(54) PREVENTING MALICIOUS LOCKOUT OF USER ACCOUNTS

(71) Applicant: EMC IP Holding Company LLC, Hopkinton, MA (US)

(72) Inventors: Radia J. Perlman, Redmond, WA (US); Benjamin S. Smith, Oakton, VA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 417 days.

(21) Appl. No.: 16/154,996

(22) Filed: Oct. 9, 2018

(65) Prior Publication Data
US 2020/0110871 A1 Apr. 9, 2020

(51) Int. Cl.
*G06F 21/45* (2013.01)
*G06F 21/64* (2013.01)

(52) U.S. Cl.
CPC ............ *G06F 21/45* (2013.01); *G06F 21/645* (2013.01)

(58) Field of Classification Search
CPC ......... G06F 21/33; G06F 21/45; G06F 21/645
See application file for complete search history.

(56) References Cited

U.S. PATENT DOCUMENTS

| 7,165,182 B2* | 1/2007 | Excoffier | G06F 21/31 713/168 |
| 7,373,524 B2* | 5/2008 | Motsinger | H04L 63/0876 713/188 |
| 7,383,570 B2* | 6/2008 | Pinkas | G06F 21/34 726/2 |
| 7,421,733 B2* | 9/2008 | Glassman | G06F 21/31 713/163 |
| 7,703,130 B2* | 4/2010 | Pinkas | H04L 63/105 726/7 |

(Continued)

OTHER PUBLICATIONS

Search Query Report from IP.com (performed Oct. 16, 2020) (Year: 2020).*

(Continued)

*Primary Examiner* — Sharon S Lynch
(74) *Attorney, Agent, or Firm* — Ryan, Mason & Lewis, LLP

(57) ABSTRACT

An authentication server in an illustrative embodiment is configured to communicate with one or more client devices over a network. Responsive to a successful login to a user account by a client device, the authentication server provides the client device with a login cookie for the user account for potential utilization in one or more subsequent logins to the user account. The authentication server initializes a cookie-specific counter for the login cookie, and increments the cookie-specific counter for each of one or more unsuccessful logins to the user account made utilizing the login cookie. Responsive to the cookie-specific counter reaching a specified value, the authentication server locks the user account for any subsequent logins to the user account made utilizing the login cookie. The authentication server resets the cookie-specific counter responsive to a successful login to the user account made utilizing the login cookie. The authentication server also maintains a non-cookie counter for counting failed logins made without utilizing a valid login cookie.

20 Claims, 3 Drawing Sheets

(56) References Cited

U.S. PATENT DOCUMENTS

| | | | | |
|---|---|---|---|---|
| 7,941,836 B2* | 5/2011 | Pinkas | H04L 63/1458 | 726/7 |
| 8,046,827 B2* | 10/2011 | Corella | H04L 63/10 | 726/6 |
| 8,132,018 B2* | 3/2012 | Eldar | H04L 63/1441 | 713/183 |
| 8,261,087 B2* | 9/2012 | Fort | H04L 9/3226 | 713/184 |
| 8,272,032 B2* | 9/2012 | Choti | H04L 67/14 | 726/2 |
| 8,302,187 B1 | 10/2012 | Gupta et al. | | |
| 8,490,162 B1* | 7/2013 | Popoveniuc | H04L 63/08 | 726/5 |
| 8,528,078 B2* | 9/2013 | Camaisa | H04L 63/1483 | 726/22 |
| 8,707,408 B2* | 4/2014 | Pinkas | G06F 21/36 | 726/7 |
| 8,738,923 B2* | 5/2014 | Kottahachchi | G06F 21/31 | 713/183 |
| 8,850,520 B1* | 9/2014 | Pike | G06F 21/33 | 726/3 |
| 8,898,752 B2* | 11/2014 | Gordon | H04L 63/08 | 726/5 |
| 9,098,689 B2* | 8/2015 | Gordon | H04L 63/10 | |
| 9,306,938 B2* | 4/2016 | Pinkas | H04L 63/12 | |
| 9,450,955 B2* | 9/2016 | Jagtap | H04L 63/20 | |
| 9,514,294 B1 | 12/2016 | Hepburn et al. | | |
| 9,838,435 B2* | 12/2017 | Jagtap | H04L 63/20 | |
| 10,044,729 B1* | 8/2018 | Astakhova | H04W 4/21 | |
| 10,104,064 B2* | 10/2018 | Pinkas | G06F 21/34 | |
| 10,320,848 B2* | 6/2019 | Kerametlian | H04L 63/205 | |
| 10,425,405 B2* | 9/2019 | Pinkas | G06F 21/34 | |
| 10,645,086 B1* | 5/2020 | Hadler | H04L 63/083 | |
| 2003/0149900 A1* | 8/2003 | Glassman | H04L 63/0807 | 726/6 |
| 2004/0059951 A1* | 3/2004 | Pinkas | G06F 21/34 | 726/5 |
| 2004/0064742 A1* | 4/2004 | Excoffier | H04L 63/083 | 726/6 |
| 2004/0153365 A1* | 8/2004 | Schneider | G06Q 30/0225 | 705/14.19 |
| 2005/0058959 A1* | 3/2005 | Fortin | F23N 1/002 | 431/12 |
| 2005/0188079 A1* | 8/2005 | Motsinger | H04L 63/1416 | 709/224 |
| 2005/0188222 A1* | 8/2005 | Motsinger | H04L 63/08 | 726/5 |
| 2005/0188423 A1* | 8/2005 | Motsinger | H04L 67/22 | 726/22 |
| 2006/0098795 A1* | 5/2006 | Choti | H04L 63/10 | 379/114.14 |
| 2007/0005985 A1* | 1/2007 | Eldar | H04L 63/1441 | 713/183 |
| 2007/0266257 A1* | 11/2007 | Camaisa | H04L 63/0838 | 713/182 |
| 2008/0016551 A1* | 1/2008 | Pinkas | H04L 63/105 | 726/2 |
| 2008/0134323 A1* | 6/2008 | Pinkas | G06F 21/36 | 726/21 |
| 2008/0184346 A1* | 7/2008 | Pinkas | H04L 63/1458 | 726/5 |
| 2008/0313721 A1* | 12/2008 | Corella | H04L 9/3226 | 726/6 |
| 2009/0019514 A1 | 1/2009 | Hazlewood et al. | | |
| 2009/0077645 A1* | 3/2009 | Kottahachchi | G06F 21/33 | 726/9 |
| 2010/0211999 A1 | 8/2010 | Grobman | | |
| 2011/0314290 A1* | 12/2011 | Fort | G06F 21/31 | 713/176 |
| 2012/0266226 A1* | 10/2012 | Pinkas | G06F 21/34 | 726/7 |
| 2013/0198819 A1* | 8/2013 | Gordon | H04L 63/10 | 726/5 |
| 2015/0040243 A1 | 2/2015 | Mittal | | |
| 2015/0058959 A1* | 2/2015 | Gordon | G06F 21/31 | 726/7 |
| 2016/0125522 A1 | 5/2016 | Tang et al. | | |
| 2016/0173485 A1 | 6/2016 | Popoveniuc et al. | | |
| 2016/0294838 A1 | 10/2016 | Cross et al. | | |
| 2017/0019395 A1* | 1/2017 | Pinkas | G06F 21/36 | |
| 2017/0134362 A1 | 5/2017 | Randall et al. | | |
| 2017/0208075 A1* | 7/2017 | Kerametlian | G06F 21/31 | |
| 2017/0244694 A1 | 8/2017 | Roth | | |
| 2017/0346809 A1 | 11/2017 | Plotnik et al. | | |
| 2017/0357976 A1 | 12/2017 | Malik et al. | | |
| 2019/0149536 A1* | 5/2019 | Pinkas | G06F 21/36 | 726/7 |

OTHER PUBLICATIONS

Search Query Report from IP.com (performed Jan. 22, 2021) (Year: 2021).*

Search Query Report from IP.com (performed May 6, 2021). (Year: 2021).*

U.S. Appl. No. 15/893,929 filed in the name of Radia J. Perlman et al. on Feb. 12, 2018 and entitled "Client-Side User Authentication Control Based on Stored History of Incorrect Passwords."

\* cited by examiner

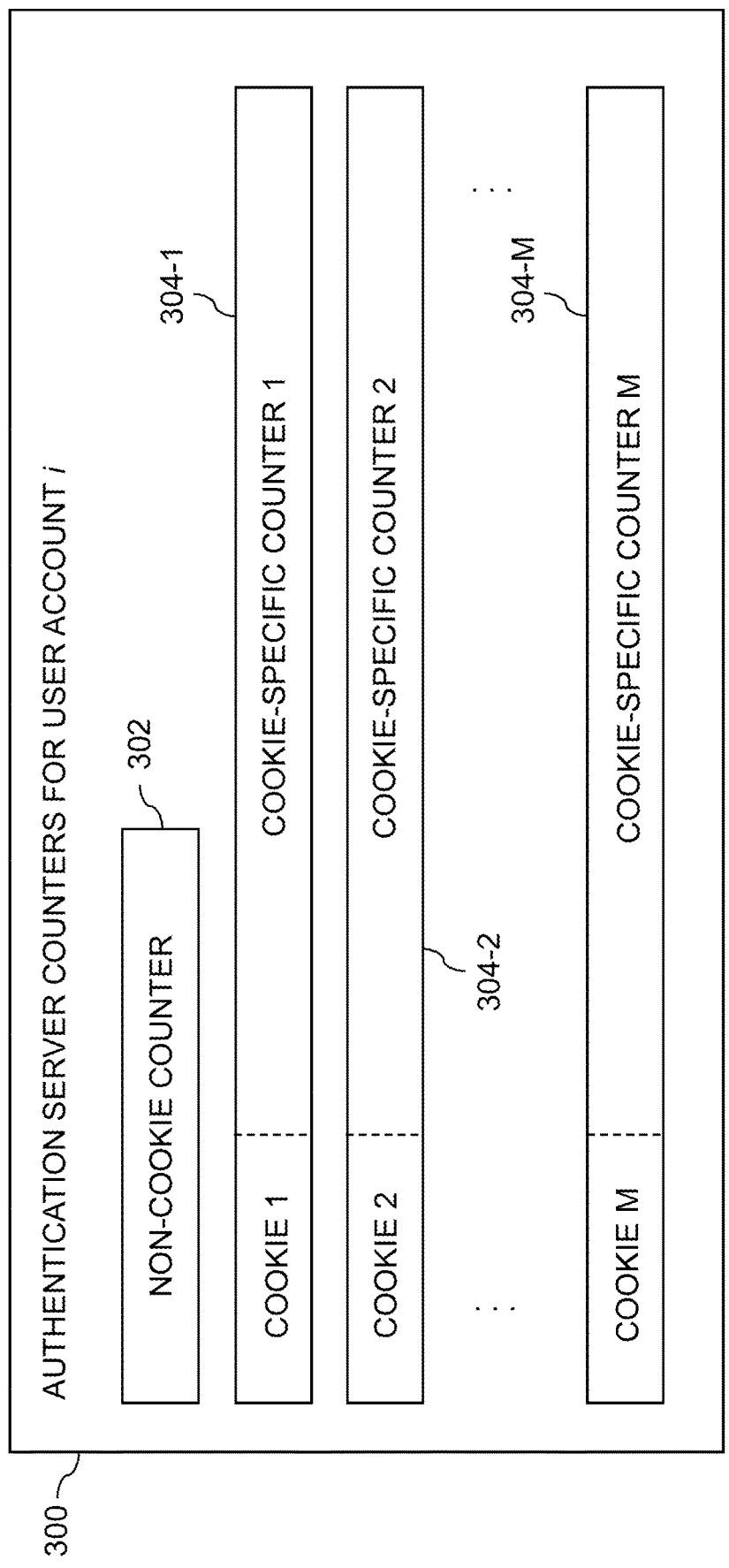

PREVENTING MALICIOUS LOCKOUT OF USER ACCOUNTS

FIELD

The field relates generally to controlling access to information resources, and more particularly to techniques for implementing user authentication in an information processing system.

BACKGROUND

Information processing systems are typically configured to require user authentication before granting a client device access to resources available over a network such as the Internet. For example, online user accounts generally require successful execution of password-based user authentication protocol between a client device and an authentication server before a user is granted access to the account. These and other systems often include a lock-out mechanism that protects against password-guessing attacks by locking the user account after a certain number of incorrect passwords have been submitted in conjunction with a given instance of the user authentication protocol. However, such arrangements are highly susceptible to denial of service (DOS) attacks, in which an attacker deliberately submits multiple incorrect passwords to a given user account for the sole purpose of malicious lockout of that account, thereby forcing the legitimate user to execute a complex password-resetting process. A need therefore exists for techniques that can reduce the likelihood of malicious lockouts in a manner that does not undermine system security.

SUMMARY

Illustrative embodiments of the invention provide server-side user authentication control based at least in part on cookie-specific counters maintained by an authentication server for respective login cookies that it provides to one or more client devices responsive to successful logins from that client device or devices.

Such arrangements can advantageously avoid situations in which a user account might otherwise be maliciously locked out due to deliberate repeated submission of an incorrect password to the same authentication server. Moreover, such advantages are achieved in a manner that does not undermine system security.

In one embodiment, an apparatus includes at least one processing device comprising a processor coupled to a memory. The processing device implements an authentication server configured to communicate with one or more client devices over a network. Responsive to a successful login to a user account by a client device, the authentication server provides the client device with a login cookie for the user account for potential utilization in one or more subsequent logins to the user account. The authentication server initializes a cookie-specific counter for the login cookie, and increments the cookie-specific counter for each of one or more unsuccessful logins to the user account made utilizing the login cookie. Responsive to the cookie-specific counter reaching a specified value, the authentication server locks the user account for any subsequent logins to the user account made utilizing the login cookie. The authentication server resets the cookie-specific counter responsive to a successful login to the user account made utilizing the login cookie.

Although some embodiments include only a single cookie-specific counter, other embodiments can include multiple cookie-specific counters. For example, the authentication server in some embodiments illustratively provides a plurality of distinct login cookies for the user account responsive to respective successful logins to the user account made without utilizing a login cookie, and maintains for the plurality of login cookies respective distinct cookie-specific counters each indicating a number of unsuccessful logins to the user account made utilizing the corresponding login cookie. At least a subset of the successful logins for which the distinct login cookies are provided are made from respective different client devices, or from respective different browsers on the same client device.

In some embodiments, the authentication server maintains a non-cookie counter of unsuccessful login attempts for the user account, and resets the non-cookie counter responsive to a successful login attempt made without utilizing a login cookie. Responsive to the non-cookie counter reaching a specified value, the authentication server locks the user account for any subsequent logins made without utilizing a login cookie.

The authentication server in some embodiments receives the login cookie in conjunction with a subsequent login, and permits the subsequent login to proceed responsive to the cookie-specific counter for the login cookie being below the specified value. Responsive to the subsequent login being successful, the authentication server resets the cookie-specific counter.

The login cookie illustratively comprises account information for the user account and a distinct cookie number.

The authentication server in some embodiments generates integrity check information for the login cookie. The integrity check information is illustratively generated utilizing a secret key of the authentication server. For example, the integrity check information may be generated as a keyed hash function of content of the login cookie, with the keyed hash function utilizing the secret key of the authentication server. Such an arrangement advantageously allows the authentication server to authenticate the login cookie in conjunction with a subsequent login to the user account made utilizing the login cookie.

Additional or alternative login cookie authentication techniques may be used. For example, the authentication server in some embodiments digitally signs the login cookie before providing the login cookie to the client device.

These and other illustrative embodiments include, without limitation, systems, apparatus, methods and computer program products comprising processor-readable storage media.

BRIEF DESCRIPTION OF THE DRAWINGS

FIG. 3 shows one possible arrangement of non-cookie and cookie-specific counters in an illustrative embodiment.

DETAILED DESCRIPTION

Illustrative embodiments of the present invention will be described herein with reference to exemplary information processing systems and associated processing devices. It is to be appreciated, however, that embodiments of the invention are not restricted to use with the particular illustrative system and device configurations shown. Accordingly, the term "information processing system" as used herein is intended to be broadly construed, so as to encompass, for example, a wide variety of different processing platforms including cloud-based processing platforms that include combinations of virtual and physical compute, network and storage resources.

Figure 1:
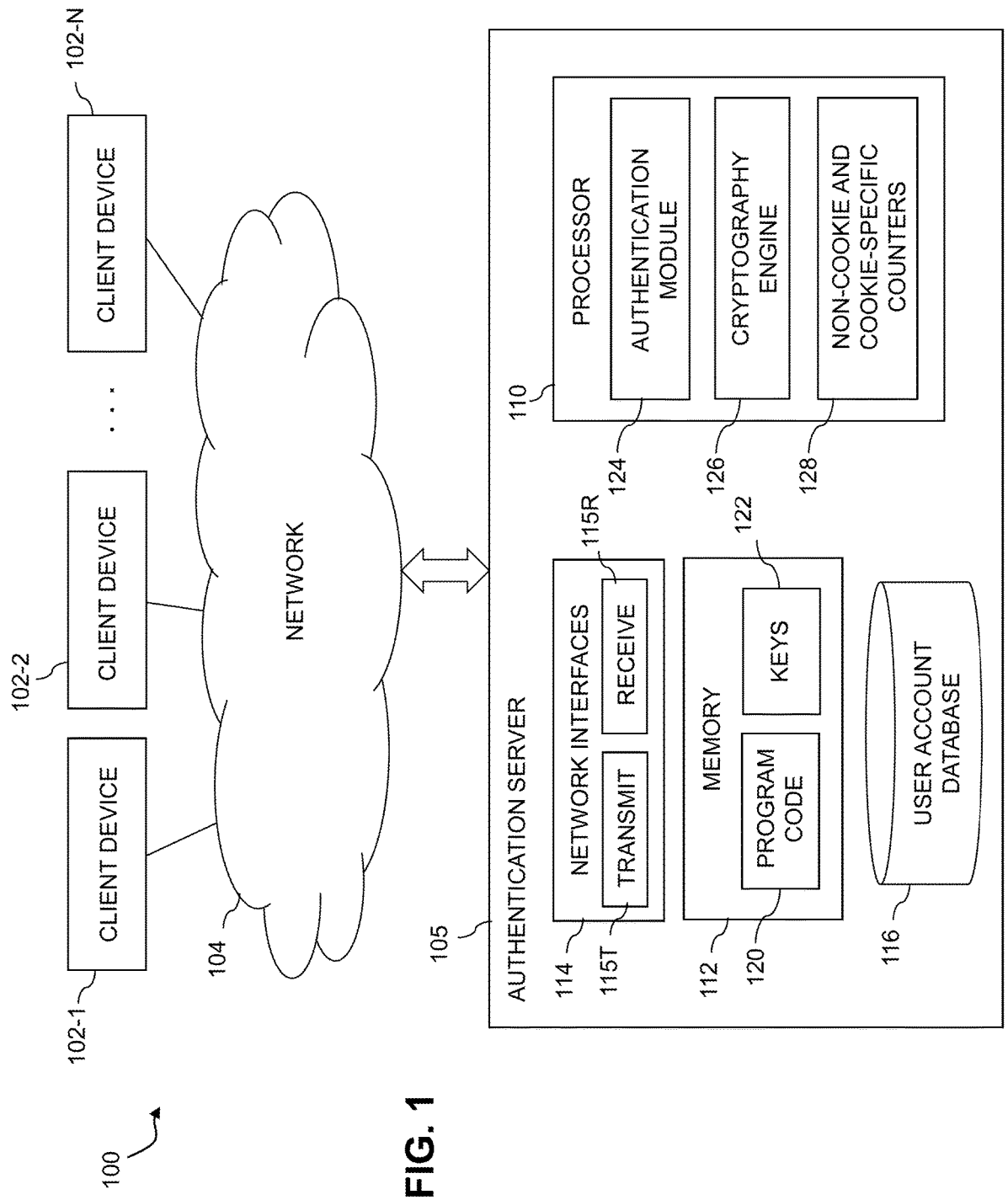
FIG. 1 is a block diagram of an information processing system comprising an authentication server implementing server-side user authentication control utilizing login cookies and respective cookie-specific counters in an illustrative embodiment.

FIG. 1 shows an information processing system 100 configured in accordance with an illustrative embodiment of the invention. The information processing system 100 comprises a plurality of client devices 102-1, 102-2, . . . 102-N, collectively referred to herein as client devices 102. The client devices 102 are coupled to a network 104. Also coupled to the network 104 is an authentication server 105. Additional authentication servers may be present in system 100 but are not explicitly shown.

A given one of the client devices 102 may comprise, for example, a mobile telephone, a laptop computer, a tablet computer, a desktop computer or another type of device from which a user authenticates to the authentication server 105. Such devices are examples of what are more generally referred to herein as "processing devices." It is also possible that one or more of the client devices 102 may be implemented at least in part using cloud-based virtualization infrastructure such as a virtual machine or container.

A given one of the client devices 102 can be equipped with multiple distinct browsers, such as a Google Chrome browser and a Microsoft Internet Explorer browser. In some embodiments of this type, different login cookies may be provided to different ones of the browsers, as will be described in more detail below.

The client devices 102 in some embodiments comprise respective computers associated with a particular company, organization or other enterprise. In addition, at least portions of the information processing system 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

A wide variety of other types of client devices 102 may be used. For example, in some embodiments, one or more of the client devices need not be associated with any particular user or users. Such client devices include, for example, Internet of Things (IoT) sensors and other types of IoT processing devices that authenticate to the authentication server 105. The term "client device" as used herein is intended to be broadly construed so as to encompass IoT processing devices as well as other types of devices that are configured to participate in a user authentication protocol with the authentication server 105.

The network 104 is assumed to comprise a portion of a global computer network such as the Internet, although other types of networks can be part of the information processing system 100, including a wide area network (WAN), a local area network (LAN), a satellite network, a telephone or cable network, a cellular network, a wireless network such as a WiFi or WiMAX network, or various portions or combinations of these and other types of networks. The information processing system 100 in some embodiments therefore comprises combinations of multiple different types of networks each comprising processing devices configured to communicate using IP or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

In the present embodiment, the client devices 102 are configured to communicate over the network 104 with the authentication server 105. Each of the client devices 102 is assumed to be implemented using a corresponding processing device comprising a processor coupled to a memory. A given one of the client devices 102 is also referred to herein as simply a "client." A processing device can be configured to implement client functionality of the type disclosed herein at least in part in the form of software or firmware of the processor. A processing device implementing such client functionality is an example of what is referred to herein as a client device or simply a "client."

The authentication server 105 in the FIG. 1 embodiment is also assumed to be implemented using at least one processing device. Each such processing device generally comprises at least one processor and an associated memory, and implements one or more functional modules for controlling certain features of the authentication server 105.

More particularly, the authentication server 105 in this embodiment comprises a processor 110 that interacts with a memory 112 and with a plurality of network interfaces 114. The processor 110 is assumed to be coupled to the memory 112 and to the network interfaces 114 via one or more signal buses or other interconnection mechanisms not explicitly shown in the figure.

The processor 110 illustratively comprises a microprocessor, a microcontroller, an application-specific integrated circuit (ASIC), a field-programmable gate array (FPGA) or other type of processing circuitry, as well as portions or combinations of such circuitry elements.

The memory 112 illustratively comprises random access memory (RAM), read-only memory (ROM), flash memory or other types of memory, in any combination. The memory 112 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory, as well as a wide variety of other types of computer program products. The term "article of manufacture" as used herein should be understood to exclude transitory, propagating signals.

The network interfaces 114 allow the authentication server 105 to communicate over the network 104 with the client devices 102, and illustratively comprise transmit components 115T and receive components 115R of one or more transceivers.

The authentication server 105 further comprises a user account database 116. The user account database 116 stores user account information for each of one or more users of the client devices 102. For example, the client devices 102 may each be associated with one or more user accounts with access to protected resources of the accounts being controlled by the authentication server 105. The user account database 116 illustratively stores passwords, user names, login cookies and other types of user account information for respective ones of a plurality of user accounts. The passwords, user names, login cookies and other types of user account information may be stored in the user account database 116 in encrypted form. Examples of other types of user account information that may be stored in the user account database 116 include other characteristics of the user and/or the client devices of that user, as well as other types of information characterizing user behavior. These other types of user account information can further include any type of information that may be applied in a given user authentication protocol implemented within system 100.

The user account database 116 in the present embodiment is illustratively implemented as part of one or more storage systems coupled to or otherwise associated with one or more processing devices that are utilized to implement the authentication server 105. Such storage systems can comprise any of a variety of different types of storage including by way of example network-attached storage (NAS), storage area networks (SANs), direct-attached storage (DAS) and distributed DAS, as well as combinations of these and other storage types, including but not limited to flash storage, storage arrays, software-defined storage, cloud storage and object-based storage.

Although shown as being arranged internally to the authentication server 105, the user account database 116 in some embodiments can be at least in part external to the authentication server 105. Also, at least portions of the user account database 116 can additionally or alternatively be implemented as an in-memory database utilizing the memory 112 of the authentication server 105.

The memory 112 in this embodiment further comprises program code 120 and cryptographic keys 122. The program code 120 illustratively comprises software that is utilized by the processor 110 to implement functionality for server-side user authentication control utilizing login cookies and respective cookie-specific counters within the authentication server 105. The cryptographic keys 122 are illustratively utilized in carrying out user authentication protocols between the authentication server 105 and one or more of the client devices 102 within the system 100.

The processor 110 further comprises an authentication module 124, a cryptography engine 126 and a set of non-cookie and cookie-specific counters 128. Such components are also referred to herein as respective "modules" of the processor 110.

In this embodiment, the authentication server 105 is configured to perform server-side portions of one or more user authentication protocols carried out between the authentication server 105 and at least one of the client devices 102. Such server-side portions of the user authentication protocols are illustratively performed under the control of the authentication module 124 of the processor 110, possibly also utilizing cryptography engine 126 and one or more of the cryptographic keys 122. The client devices 102 are configured to perform corresponding client-side portions of the one or more user authentication protocols.

As part of the server-side portion of a given user authentication protocol implemented by the authentication server 105, the authentication server 105, responsive to a successful login to a user account by a given one of the client devices, provides the client device with a login cookie for the user account. The successful login is illustratively a successful login made without utilizing a login cookie. The login cookie provided to the client device by the authentication server 105 is for potential utilization by the client device in one or more subsequent logins to the user account from that client device.

The term "login cookie" as used herein is intended to be broadly construed, so as to comprise information provided by the authentication server 105 to one of the client devices 102 or to a browser on that client device for purposes of allowing the authentication server 105 to recognize that same client device or browser in conjunction with a subsequent login attempt that it initiates.

The authentication server 105 also initializes a cookie-specific counter for the login cookie. The cookie-specific counter is incremented by the authentication server 105 for each of one or more unsuccessful logins to the user account made utilizing the login cookie. Responsive to the cookie-specific counter reaching a specified value, illustratively a specified maximum value of the cookie-specific counter, the authentication server 105 locks the user account for any subsequent logins to the user account made utilizing the login cookie. The authentication server 105 resets the cookie-specific counter responsive to a successful login to the user account made utilizing the login cookie.

In some embodiments, the authentication server 105 provides a plurality of distinct login cookies for the user account responsive to respective successful logins to the user account made without utilizing a login cookie. For example, at least a subset of the successful logins for which the distinct login cookies are provided are made from respective different client devices or from respective different browsers on the same client device. Accordingly, if successful logins are made to the user account from two different client devices 102 without utilizing any login cookie, distinct login cookies may be provided to each of those different client devices 102 by the authentication server 105. As another example, if successful logins are made to the user account from two different browsers running on the same one of the client devices 102 without utilizing any login cookie, distinct login cookies may be provided to each of those different browsers by the authentication server 105.

The authentication server 105 in such embodiments maintains for each of the login cookies a distinct cookie-specific counter indicating a number of unsuccessful logins to the user account made utilizing the corresponding login cookie.

The authentication server 105 also maintains a non-cookie counter of unsuccessful logins for the user account. The non-cookie counter counts failed logins to the user account that are made without utilizing a login cookie. The authentication server 105 resets the non-cookie counter responsive to a successful login attempt made without utilizing a login cookie. Responsive to the non-cookie counter reaching a specified value, illustratively a specified maximum value of the non-cookie counter, the authentication server locks the user account for any subsequent logins to the user account made without utilizing a login cookie.

If the user account is locked responsive to either a cookie-specific counter or the non-cookie counter reaching its specified maximum value, the user account may subsequently be unlocked responsive to successful completion of an account reset mechanism, such as the user entering a temporary code provided by the authentication server 105 via email or text message to another client device of that user. Other types of account reset mechanisms may be used, as described elsewhere herein.

The specified maximum values for the non-cookie and cookie-specific counters can be the same value, or different values. For example, each of the counters can have a maximum value of three, corresponding to three failed login attempts before the account is locked. Different maximum values or combinations of multiple distinct values for different counters can be used in other embodiments.

The authentication server 105 receives a login cookie from one of the client devices 102 in conjunction with a subsequent login to the user account, and permits the subsequent login to proceed responsive to the cookie-specific counter for the login cookie being below the specified maximum value. Responsive to the subsequent login being successful, the authentication server 105 resets the cookie-specific counter. The non-cookie counter may but need not also be reset upon the successful login made utilizing the login cookie.

The login cookie illustratively comprises account information for the user account and a distinct cookie number. An example set of non-cookie and cookie-specific counters will be described below in conjunction with FIG. 3.

The authentication server 105 in some embodiments generates integrity check information for the login cookie and provides the integrity check information to the client device as part of or otherwise in conjunction with the login cookie. The integrity check information is illustratively generated by cryptography engine 126 utilizing a secret key of the authentication server. Such a secret key is stored as one of the cryptographic keys 122 in the memory 112.

For example, the integrity check information is illustratively generated by the cryptography engine 126 as a keyed hash function of content of the login cookie. The keyed hash function may utilize the above-noted secret key in the cryptographic keys 122 of the authentication server 105. The keyed hash function in some embodiments may be of the form h(S, cookie content), where h denotes a hash function and S denotes a secret known only to the authentication server 105, such as the secret key in the cryptographic keys 122. An arrangement of this type advantageously ensures that only the authentication server 105 can authenticate the cookie, as the secret S is assumed to be known only to the authentication server 105.

In other embodiments, the integrity check information can comprise a digital signature on the login cookie. Such a digital signature is illustratively generated by the cryptography engine 126 using a private key of a private-public key pair of the authentication server 105. Such a private key is also illustratively stored in memory 112 as one of the cryptographic keys 122. A digital signature arrangement of this type can allow entities other than the authentication server 105 to authenticate the cookie.

Regardless of the particular type of integrity check information used, the authentication server 105 utilizes that information to authenticate the login cookie in conjunction with a subsequent login to the user account made utilizing the login cookie. The authenticated login cookie is also referred to herein as a "valid" login cookie.

Illustrative embodiments of the type described above can allow a legitimate user to continue to access his or her user account even after an attacker has deliberately submitted multiple incorrect passwords for the sole purpose of malicious lockout of that account. More particularly, the failed logins attributable to the attacker are illustratively performed without submission of a valid login cookie and therefore cause the non-cookie counter to reach its maximum value, resulting in the locking of the account for subsequent logins made without utilizing a login cookie. However, these failed logins do not adversely impact any cookie-specific counter. Accordingly, assuming that the legitimate user has been previously provided with one or more login cookies that still have counters below their respective maximum values, the legitimate user is permitted one or more additional logins that are not available to the attacker. The legitimate user can therefore access the account without being forced to execute a complex password-resetting process, and the malicious lockout attack is averted.

These and other illustrative embodiments allow the authentication server 105 to differentiate between different client devices 102 as well as between different browsers on the same client device. For example, successful logins made by the legitimate user from different client devices or different browsers on the same client device without submission of a login cookie will result in the client devices or browsers each receiving from the authentication server 105 a login cookie that has a corresponding cookie-specific counter maintained by the authentication server 105. Once a given cookie-specific counter has reached its maximum number of failed logins, the authentication server will no longer accept additional logins made utilizing the corresponding "tainted" login cookie. Accordingly, the authentication server 105 in effect invalidates or otherwise revokes the login cookie until such time as its cookie-specific counter is reset, possibly in conjunction with a subsequent successful login made with a different login cookie or without any login cookie.

Such arrangements can ensure that a user with multiple client devices or multiple browsers on the same client device, and previous successful logins on each of the client devices or browsers, will not be maliciously locked out of his or her account, as long as the cookie-specific counter for the login cookie on at least one of the client devices or browsers has not reached its maximum value.

Additional or alternative authentication techniques can be implemented by the authentication server 105 in conjunction with the login cookies and cookie-specific counters described above. For example, the authentication server 105 can maintain a blacklist of IP addresses or IP address ranges to facilitate identification of client devices that have initiated excessive numbers of failed logins to a user account. Additionally or alternatively, the authentication server 105 can maintain a whitelist of IP addresses or IP address ranges to identify client devices that have initiated successful logins to the user account. Such information can be stored by the authentication server 105 in the user account database 116 and utilized in some embodiments to supplement the counter-based approaches previously described. Features such as the particular maximum values of the non-cookie and cookie-specific counters, as well as additional or alternative account locking criteria and associated account reset mechanisms, can be based at least in part on the blacklist or whitelist maintained by the authentication server 105.

Numerous alternative arrangements implementing a blacklist and/or a whitelist are possible. For example, in some embodiments, blacklist and/or whitelist information of the type described above can be stored not in the authentication server 105 itself, but instead in another server or other entity of the system 100, not explicitly shown in the figure, and presented via a data feed from that other system entity into the authentication server 105.

In some embodiments, a given login is initiated by a given one of the client devices 102 submitting a user name and a password to the authentication server 105, possibly in conjunction with a login cookie previously provided to that client device by the authentication server 105. It should be noted that the term "password" as used herein is intended to be broadly construed, so as to encompass, for example, a passcode, a passphrase or other arrangement of information utilized to authenticate a user to the authentication server 105.

Also, terms such as "submitting" or "submission" of a password from one of the client devices 102 to the authentication server 105 should not be construed as limited to submission of the password itself. For example, the password can be submitted in encrypted form, or after being subject to other types of cryptographic operations. Submission of a password herein may therefore involve submission of information derived from the password in one of the client devices 102 in a manner that permits the authentication server 105 to authenticate the user based on that information.

Accordingly, a given one of the client devices 102 may be configured to submit the password to the authentication server 105 in the form of authentication information computed as a cryptographic function of the password.

Alternatively, the client device may be configured to submit the password to the authentication server 105 in the form of authentication information computed using the password and a challenge received by the client device from the authentication server 105.

The authentication server 105 can therefore be configured to operate with any of a wide variety of different password-based protocols.

For example, the user authentication protocol carried out between one of the client devices 102 and the authentication server 105 may comprise a Kerberos-type protocol, in which the client device sends an authenticator that illustratively comprises the time of day encrypted under a user password.

In such an arrangement, the authentication server 105 may be configured to indicate that the submitted password is incorrect by generating an error message back to the submitting client device if the authentication server detects that the wrong password was used to encrypt the authenticator.

As another example, the user authentication protocol carried out between one of the client devices 102 and the authentication server 105 may comprise a Challenge-Handshake Authentication Protocol (CHAP) or another type of challenge-based authentication protocol, in which the client device receives a challenge from the authentication server, and responds by sending a hash of at least a portion of the challenge and a user password. Again, a submission of authentication information of this type is considered to be a type of submission of a password as that term is broadly used herein.

Numerous other alternative arrangements of password submission are possible, depending upon the particular requirements of the user authentication protocol being carried out between the client device and the authentication server.

As indicated above, aspects of the server-side user authentication control in the FIG. 1 embodiment are implemented at least in part through cooperative interaction of authentication module 124, cryptography engine 126 and non-cookie and cookie-specific counters 128 of the processor 110 in the authentication server 105.

It is to be appreciated that the particular arrangement of modules 124, 126 and 128 illustrated in the processor 110 of the FIG. 1 embodiment is presented by way of example only, and alternative arrangements can be used in other embodiments. For example, the functionality associated with the modules 124, 126 and 128 in other embodiments can be combined into a single module, or separated across a larger number of modules. As another example, multiple distinct processors can be used to implement different ones of the modules 124, 126 and 128 or portions thereof.

At least portions of the modules 124, 126 and 128 may be implemented at least in part in the form of software comprising program code 120 stored in memory 112 and executed by processor 110.

It should also be understood that the particular set of elements shown in FIG. 1 for implementing functionality for server-side user authentication control based at least in part on login cookies and cookie-specific counters in information processing system 100 is presented by way of illustrative example only, and in other embodiments additional or alternative elements may be used. Thus, another embodiment may include additional or alternative systems, devices and other network entities, as well as different arrangements of modules and other components.

An illustrative embodiment of an example process for server-side user authentication control based at least in part on login cookies and cookie-specific counters in the information processing system 100 will now be described in more detail with reference to the flow diagram of FIG. 2.

In this embodiment, it is assumed that a user associated with one or more of the client devices 102 is attempting to access a user account over the network 104, and that access to the user account from the client device requires successful user authentication to the authentication server 105.

The process as illustrated includes steps 200 through 224, which are assumed to be performed primarily by the authentication server 105. It is to be understood that this particular process is only an example, and additional or alternative processes can be carried out in other embodiments.

In step 200, the process starts. At this point, a non-cookie counter maintained by the authentication server for the user account is assumed to be initiated. The non-cookie counter in this embodiment is a type of "fail" counter that counts the number of failed logins that are performed without utilizing a login cookie.

In step 202, a login to the user account is initiated from one of the client devices 102. Such an initiation of a login is also referred to herein as a "login attempt" or as simply a "login" and a given login can be successful, in which case access to the user account is granted to the client device that initiated the login, or unsuccessful, in which case access to the user account is denied to that client device. The initiation of the login illustratively involves submission of a user name and a password for the user account from the client device. As indicated above, the term "password" as used herein is intended to be broadly construed, so as to encompass, for example, a passcode, a passphrase or other arrangement of information utilized to authenticate a user to the authentication server.

In step 204, the authentication server determines if a valid login cookie has been received from the client device in conjunction with the login. If no valid login cookie was received, the process moves to step 206, which checks the current value of the non-cookie counter. Otherwise, the process moves to step 216, which checks the current value of a cookie-specific counter for the valid login cookie. The authentication server identifies a "valid" login cookie by authenticating that login cookie using integrity information, a digital signature, or other types of authentication information associated with the login cookie.

In step 206, a determination is made as to whether or not the non-cookie counter is at its specified maximum value. If it is not at its specified maximum value, the process moves to step 210 to process the login made without a valid login cookie. Otherwise, the process moves to step 208 as indicated.

In step 208, the client device is informed that the user account is locked for logins made without utilization of a login cookie, based on the non-cookie counter having met its specified maximum value. This non-cookie counter based account lock remains in place until cleared, for example, by the user, by an administrator or by an automated system entity, through an appropriate account reset mechanism. The process meanwhile returns to step 200 to await another login for the user account. For example, the user may still obtain access to the user account through the use of a valid login cookie obtained through a previous successful login, even though it is currently no longer possible to submit additional logins without a login cookie due to the non-cookie counter based account lock. The authentication server in step 208 also provides instructions for unlocking the user account such that one or more additional logins can be made without a valid login cookie.

In step 210, a determination is made as to whether or not the login is successful without the use of a valid login cookie. If the login is successful, the process moves to step 214, and otherwise the process moves to step 212.

In step 212, the non-cookie counter maintained for the user account is incremented responsive to the failed login. The process then returns to step 200 to await another login for the user account. The non-cookie counter in the present embodiment is incremented for each failed login made without a login cookie.

As indicated above, the authentication server also maintains at least one cookie-specific counter that is incremented for each failed login attempt made using a corresponding login cookie. Other embodiments can use multiple cookie-specific counters to count failed logins made using respective distinct login cookies.

In step 214, which is reached responsive to a successful login in step 210, the authentication server resets the non-cookie counter, creates a new login cookie, initiates a cookie-specific counter for the new login cookie, and sends the new login cookie to the client device. The process then returns to step 200 to await another login for the user account. In different instances of step 214 performed for respective distinct received logins, different login cookies can be provided by the authentication server to respective different client devices from which attempts are made to access the user account. Additionally or alternatively, different login cookies can be provided to respective different browsers on the same client device.

In some embodiments, the authentication server can be configured to first determine if the client device is a public machine, in which case it may not provide a cookie to that public machine in step 214. Such a public machine illustratively comprises a client device whose primary purpose is to serve more than one user in a public environment, and is therefore by design a shared resource from which multiple users will connect. As it can be costly in terms of computational and memory resources to maintain per-cookie state for large numbers of client devices, the authentication server can avoid providing cookies to public machines for which the cookies will likely be automatically erased when the user logs out.

In step 216, a determination is made as to whether or not the cookie-specific counter is at its specified maximum value. If it is not at its specified maximum value, the process moves to step 220 to process the login made with the valid login cookie. Otherwise, the process moves to step 218 as indicated.

In step 218, the client device is informed that the user account is locked for logins made with utilization of the login cookie, based on the cookie-specific counter for that particular login cookie having met its specified maximum value. This cookie-specific counter based account lock value remains in place until cleared, for example, by the user, by an administrator or by an automated system entity, through an appropriate account reset mechanism. The process meanwhile returns to step 200 to await another login for the user account. For example, the user may still obtain access to the user account through the use of a different valid login cookie, even though it is currently no longer possible to submit additional logins for the particular login cookie that has reached its maximum counter value. The authentication server in step 218 also provides instructions for unlocking the user account such that one or more additional logins can be made utilizing the particular login cookie that has reached its maximum counter value.

In step 220, a determination is made as to whether or not the login is successful with the use of a valid login cookie. If the login is successful, the process moves to step 224, and otherwise the process moves to step 222.

In step 222, the cookie-specific counter for the login cookie utilized in the unsuccessful login is incremented. The process then returns to step 200 to await another login for the user account. Although in this embodiment the non-cookie counter is not incremented responsive to an unsuccessful login made using a valid login cookie, in other embodiments both the non-cookie counter and the cookie-specific counter can be incremented responsive to an unsuccessful login made using the valid login cookie. It should also be noted in this regard that the non-cookie counter and the cookie-specific counters may have different maximum values established by the authentication server.

In step 224, which is reached responsive to a successful login in step 220, the cookie-specific counter for the login cookie utilized in the successful login is reset. The process then returns to step 200 to await another login for the user account. In this embodiment, the non-cookie counter is not reset responsive to the successful login made using the login cookie, but instead only the cookie-specific counter for that login cookie is reset.

Alternative embodiments can be configured to reset both the cookie-specific counter and the non-cookie counter responsive to the successful login made using the login cookie. In embodiments in which there are multiple cookie-specific counters for respective distinct login cookies generated by the authentication server for the user account, all of the cookie-specific counters, and possibly also the non-cookie counter, may be reset responsive to a successful login made using any one of the multiple login cookies.

Responsive to the locking of the user account based on the non-cookie counter having reached its specified maximum value or based on the cookie-specific counter having reached its specified maximum value, the authentication server implements an appropriate account reset mechanism in order to provide the user with an opportunity to unlock the account. For example, the authentication server may prompt the user to reset the account and thereby release the lock by entering a temporary code texted or emailed to a client device other than the one associated with the locking of the account. Additionally or alternatively, the user may be prompted to answer one or more security questions (e.g., "what is your favorite flavor of ice cream?"), to call customer service, or to undertake various other actions designed to authenticate the user for purposes of account reset. The account reset mechanism may in some cases require the user to change his or her password. It is also possible that the account lock may be a temporary lock that automatically unlocks after a specified period of time.

Figure 2:
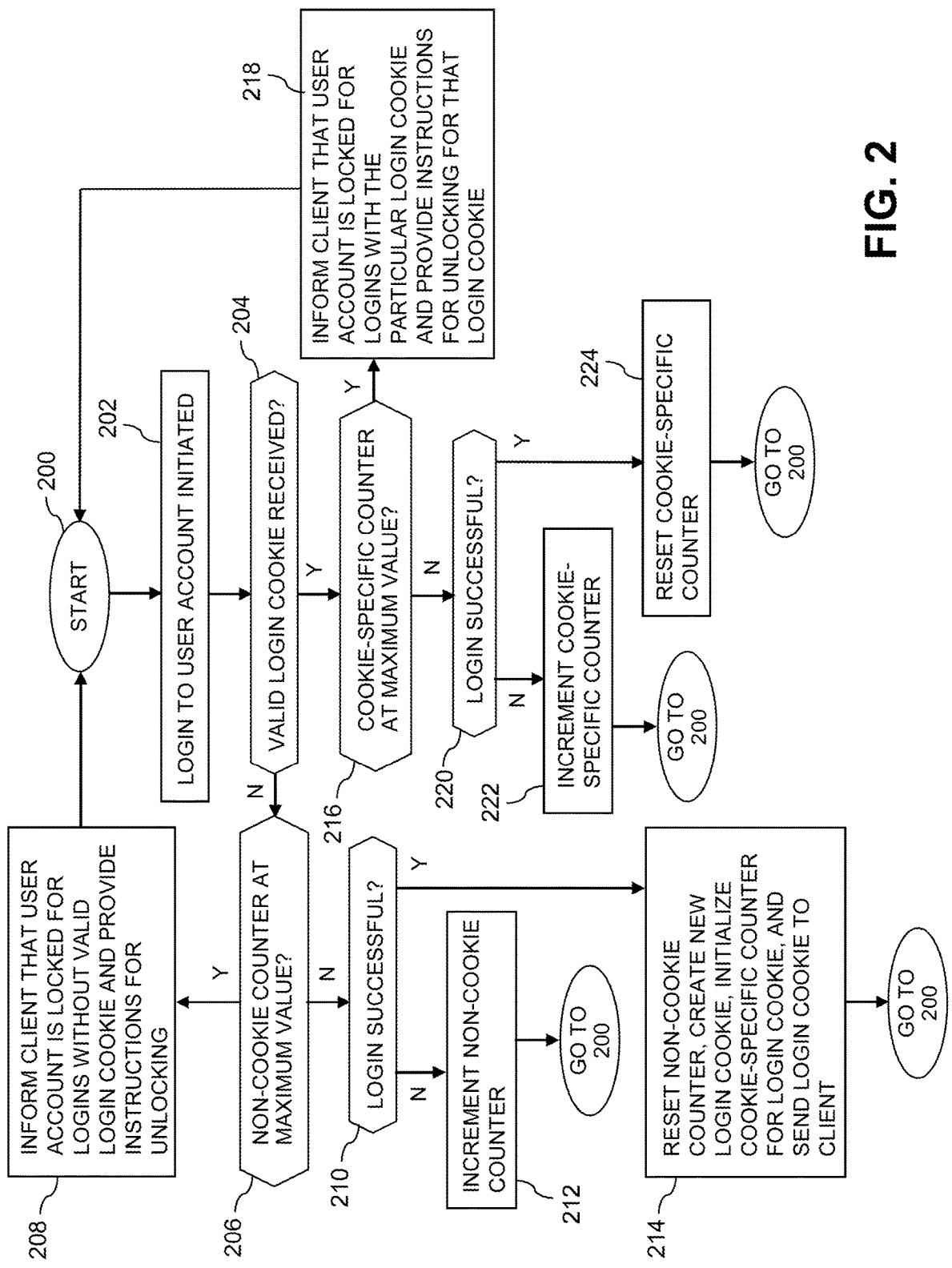
FIG. 2 is a flow diagram of an example process for server-side user authentication control utilizing login cookies and respective cookie-specific counters in an illustrative embodiment.

As a more particular example of one possible reset mechanism that may be implemented in conjunction with a user account lock arising in the FIG. 2 process, the authentication server can send the above-noted temporary code to the user's backup authentication mechanism (e.g., text or email). If the client device successfully sends the code, together with the "tainted" login cookie, the cookie-specific counter for that login cookie is reset. If the client device successfully sends the code without a login cookie, the non-cookie counter is reset. Numerous alternative reset mechanisms can be used in other embodiments.

As noted above, an account lock can be cleared by the user, by an administrator or by an automated system entity. Combinations of multiple ones of these and other system entities may be required to participate in a given account reset mechanism, and illustrative embodiments are not limited in this regard. For example, an administrator or automated system entity may mediate between the user and the authentication server in carrying out a procedure for unlocking the user account.

The subsequent release of the lock previously instituted responsive to the non-cookie counter or the cookie-specific counter having reached a specified maximum value can also result in the automatic reset of the corresponding non-cookie counter or cookie-specific counter. It is also possible that all of the non-cookie and cookie-specific counters may be reset responsive to release of the lock.

The particular processing operations and other system functionality described in conjunction with the flow diagram of FIG. 2 are presented by way of illustrative example only, and should not be construed as limiting the scope of the invention in any way. Alternative embodiments can use other types of processing operations to implement server-side user authentication control based on login cookies and cookie-specific counters. For example, certain steps may be performed at least in part concurrently with one another rather than serially. As additional examples, one or more of the process steps may be repeated periodically for different user authentication protocol instances, and multiple such processing instances can be performed in parallel with one another to provide server-side user authentication control for different users and/or user accounts within a given information processing system.

Also, functionality such as that described in conjunction with the flow diagram of FIG. 2 can be implemented at least in part in the form of one or more software programs stored in program code 120 of memory 112 and executed by processor 110. As mentioned previously, a storage device or other memory having executable program code of one or more software programs embodied therein is an example of what is more generally referred to herein as a "processor-readable storage medium."

The foregoing example process is therefore illustrative only, and should not be viewed as limiting the scope of any particular embodiment in any way. Those skilled in the art will appreciate that numerous alternative client-side user authentication control arrangements can be used in other embodiments.

As mentioned above, illustrative embodiments utilize a non-cookie counter in conjunction with at least one cookie-specific counter in controlling access to a given user account. Each cookie-specific counter is associated with a distinct login cookie provided by the authentication server to a particular client device from which logins to the user account are attempted. For example, the authentication server can provide different login cookies to different client devices from which such logins are attempted, or can provide different login cookies to different browsers on the same client device.

FIG. 3 shows one possible arrangement of non-cookie and cookie-specific counters in an illustrative embodiment. In this embodiment, the authentication server maintains a set of counters 300 for a given user account i, with similar sets of counters being maintained for each of a plurality of other user accounts. The set of counters 300 comprises a non-cookie counter 302 and a plurality of cookie-specific counters 304-1, 304-2, . . . 304-M for respective login cookies having respective cookie identifiers Cookie 1, Cookie 2, . . . Cookie M.

As mentioned previously, other embodiments can include only a single cookie-specific counter. Also, different maximum values may be specified for the non-cookie counter 302 and for each of at least a subset of the cookie-specific counters 304. For example, in some embodiments, the specified maximum value for a given one of cookie-specific counters may be selected based at least in part on the particular type of client device to which the corresponding login cookie is provided, as well as the application to which the client device is connecting.

Illustrative embodiments provide a number of significant advantages relative to conventional arrangements. For example, one or more such embodiments avoid situations in which a user account might otherwise be maliciously locked out due to deliberate repeated submission of an incorrect password to the same authentication server. Moreover, such advantages are achieved in a manner that does not undermine system security.

Such embodiments advantageously provide an efficient and practical countermeasure to DOS attacks, in which an attacker deliberately submits multiple incorrect passwords to a given user account for the sole purpose of malicious lockout of that account. These embodiments make it less likely that a legitimate user will be forced to execute a complex password-resetting process as a result of a DOS attack.

The disclosed techniques are simple to implement in illustrative embodiments, and can be adapted in a straightforward manner for use with a wide variety of different types of authentication servers and associated server-side authentication protocols running on those authentication servers.

It is to be appreciated that the foregoing advantages are illustrative of advantages provided in certain embodiments, and need not be present in other embodiments.

The information processing systems disclosed herein are illustratively implemented using one or more processing platforms, examples of which will be now be described in greater detail. A given such processing platform comprises at least one processing device comprising a processor coupled to a memory.

In some embodiments, portions of an information processing system as disclosed herein illustratively comprise cloud infrastructure. The cloud infrastructure in some embodiments comprises a plurality of containers implemented using container host devices. More particularly, the cloud infrastructure in one or more illustrative embodiments comprises container-based virtualization infrastructure configured to implement Docker containers or other types of Linux containers (LXCs).

The cloud infrastructure may additionally or alternatively comprise other types of virtualization infrastructure such as virtual machines implemented using a hypervisor. An example of a commercially available hypervisor platform that may be used to implement portions of the information processing system 100 in an illustrative embodiment is the VMware® vSphere® which may have an associated virtual infrastructure management system such as the VMware® vCenter™. The underlying physical machines may comprise one or more distributed processing platforms that include one or more storage systems.

The cloud infrastructure mentioned above may represent at least a portion of one processing platform. Another example of such a processing platform is a plurality of processing devices which communicate with one another over a network. The network may comprise any type of network, including, by way of example, a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an ASIC, an FPGA or other type of processing circuitry, as well as portions or combinations of such circuitry elements. The memory may comprise RAM, ROM, flash memory or other types of memory, in any combination. The memory and other memories disclosed herein should be viewed as illustrative examples of what are more generally referred to as "processor-readable storage media" storing executable program code of one or more software programs.

As indicated above, articles of manufacture and other computer program products comprising such processor-readable storage media are considered embodiments of the present invention.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

The particular processing platforms described above are presented by way of example only, and a given information processing system such as system 100 may include additional or alternative processing platforms, as well as numerous distinct processing platforms in any combination, with each such platform comprising one or more computers, servers, storage devices or other processing devices.

Processing devices and other information processing system components can communicate with one another using a variety of different communication protocols and associated communication media.

As indicated previously, components of an information processing system as disclosed herein can be implemented at least in part in the form of one or more software programs stored in memory and executed by a processor of a processing device.

It should again be emphasized that the above-described embodiments of the invention are presented for purposes of illustration only. Many variations and other alternative embodiments may be used. For example, the disclosed techniques are applicable to a wide variety of other types of information processing systems and associated processing devices. Also, the particular features of the illustrative embodiments of FIGS. 1 through 3 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
   at least one processing device comprising a processor coupled to a memory;
   the processing device implementing an authentication server configured to communicate with one or more client devices over a network;
   wherein the authentication server is further configured:
   responsive to a successful login to a user account by a client device, to provide the client device with a login cookie for the user account for utilization in one or more subsequent logins to the user account, wherein the authentication server digitally signs the login cookie before providing the login cookie to the client device;
   to initialize a cookie-specific counter for the login cookie;
   to increment the cookie-specific counter for each of one or more unsuccessful logins to the user account made utilizing the login cookie; and
   responsive to the cookie-specific counter reaching a specified value, to lock the user account for any subsequent logins to the user account made utilizing the login cookie; and
   wherein the authentication server is further configured:
   to maintain a non-cookie counter of unsuccessful logins for the user account that are made without utilizing a login cookie;
   to reset the non-cookie counter responsive to a successful login attempt made without utilizing a login cookie; and
   responsive to the non-cookie counter reaching a specified value, to lock the user account for any subsequent logins made without utilizing a login cookie.

2. The apparatus of claim 1 wherein the authentication server is further configured to reset the cookie-specific counter responsive to a successful login to the user account made utilizing the login cookie.

3. The apparatus of claim 1 wherein the authentication server is further configured to provide a plurality of distinct login cookies for the user account responsive to respective successful logins to the user account made without utilizing a login cookie.

4. The apparatus of claim 3 wherein the authentication server is further configured to maintain for each of the login cookies a distinct cookie-specific counter indicating a number of unsuccessful logins to the user account made utilizing the corresponding login cookie.

5. The apparatus of claim 3 wherein at least a subset of the successful logins for which the distinct login cookies are provided are made from respective different client devices or from respective different browsers on the same client device.

6. The apparatus of claim 1 wherein the authentication server is further configured:
   to receive the login cookie in conjunction with a subsequent login; and to permit the subsequent login to proceed responsive to the cookie-specific counter for the login cookie being below the specified value.

7. The apparatus of claim 6 wherein the authentication server is further configured:
responsive to the subsequent login being successful, to reset the cookie-specific counter.

8. The apparatus of claim 1 wherein the login cookie comprises account information for the user account and a distinct cookie number.

9. The apparatus of claim 1 wherein the authentication server is further configured to authenticate the login cookie in conjunction with a subsequent login to the user account made utilizing the login cookie.

10. The apparatus of claim 1 wherein the authentication server is further configured to generate integrity check information for the login cookie and to provide the integrity check information to the client device as part of the login cookie wherein the integrity check information is generated utilizing a secret key of the authentication server.

11. An apparatus comprising:
at least one processing device comprising a processor coupled to a memory;
the processing device implementing an authentication server configured to communicate with one or more client devices over a network;
wherein the authentication server is further configured:
responsive to a successful login to a user account by a client device, to provide the client device with a login cookie for the user account for utilization in one or more subsequent logins to the user account, wherein the authentication server generates integrity check information for the login cookie and provides the integrity check information to the client device as part of the login cookie, the integrity check information being generated utilizing a secret key of the authentication server;
to initialize a cookie-specific counter for the login cookie;
to increment the cookie-specific counter for each of one or more unsuccessful logins to the user account made utilizing the login cookie; and
responsive to the cookie-specific counter reaching a specified value, to lock the user account for any subsequent logins to the user account made utilizing the login cookie; and
wherein the authentication server is further configured:
to maintain a non-cookie counter of unsuccessful logins for the user account that are made without utilizing a login cookie;
to reset the non-cookie counter responsive to a successful login attempt made without utilizing a login cookie; and
responsive to the non-cookie counter reaching a specified value, to lock the user account for any subsequent logins made without utilizing a login cookie.

12. The apparatus of claim 11 wherein the integrity check information is generated as a keyed hash function of content of the login cookie and wherein the keyed hash function utilizes the secret key of the authentication server.

13. A method comprising:
responsive to a successful login to a user account by a client device, providing the client device with a login cookie for the user account for utilization in one or more subsequent logins to the user account;
initializing a cookie-specific counter for the login cookie;
incrementing the cookie-specific counter for each of one or more unsuccessful logins to the user account made utilizing the login cookie; and
responsive to the cookie-specific counter reaching a specified value, locking the user account for any subsequent logins to the user account made utilizing the login cookie;
wherein the method is performed by an authentication server implemented by at least one processing device comprising a processor coupled to a memory; and
wherein the authentication server:
digitally signs the login cookie before providing the login cookie to the client device;
maintains a non-cookie counter of unsuccessful login attempts for the user account that are made without utilizing a login cookie;
resets the non-cookie counter responsive to a successful login attempt made without utilizing the login cookie; and
responsive to the non-cookie counter reaching a specified value, locks the user account for any subsequent logins made without utilizing a login cookie.

14. The method of claim 13 wherein the authentication server provides a plurality of distinct login cookies for the user account responsive to respective successful logins to the user account made without utilizing a login cookie and maintains for the plurality of login cookies respective distinct cookie-specific counters each indicating a number of unsuccessful logins to the user account made utilizing the corresponding login cookie.

15. The method of claim 13 wherein the authentication server:
receives the login cookie in conjunction with a subsequent login;
permits the subsequent login to proceed responsive to the cookie-specific counter for the login cookie being below the specified value; and
responsive to the subsequent login being successful, resets the cookie-specific counter.

16. The method of claim 13 wherein the authentication server generates integrity check information for the login cookie and provides the integrity check information to the client device as part of the login cookie wherein the integrity check information is generated utilizing a secret key of the authentication server.

17. A computer program product comprising a non-transitory processor-readable storage medium having stored therein program code of one or more software programs, wherein the program code when executed by at least one processing device causes an authentication server implemented by said at least one processing device:
responsive to a successful login to a user account by a client device, to provide the client device with a login cookie for the user account for utilization in one or more subsequent logins to the user account, wherein the authentication server digitally signs the login cookie before providing the login cookie to the client device;
to initialize a cookie-specific counter for the login cookie;
to increment the cookie-specific counter for each of one or more unsuccessful logins to the user account made utilizing the login cookie; and
responsive to the cookie-specific counter reaching a specified value, to lock the user account for any subsequent logins to the user account made utilizing the login cookie;

wherein the program code when executed by said at least one processing device further causes the authentication server:
to maintain a non-cookie counter of unsuccessful login attempts for the user account that are made without utilizing a login cookie;
to reset the non-cookie counter responsive to a successful login attempt made without utilizing the login cookie; and
responsive to the non-cookie counter reaching a specified value, to lock the user account for any subsequent logins made without utilizing a login cookie.

18. The computer program product of claim 17 wherein the authentication server provides a plurality of distinct login cookies for the user account responsive to respective successful logins to the user account made without utilizing a login cookie and maintains for the plurality of login cookies respective distinct cookie-specific counters each indicating a number of unsuccessful logins to the user account made utilizing the corresponding login cookie.

19. The computer program product of claim 17 wherein the authentication server:
receives the login cookie in conjunction with a subsequent login;
permits the subsequent login to proceed responsive to the cookie-specific counter for the login cookie being below the specified value; and
responsive to the subsequent login being successful, resets the cookie-specific counter.

20. The computer program product of claim 17 wherein the authentication server generates integrity check information for the login cookie and provides the integrity check information to the client device as part of the login cookie wherein the integrity check information is generated utilizing a secret key of the authentication server.

* * * * *